INVENTOR.
Joseph J. Gaysowski

Oct. 31, 1961   J. J. GAYSOWSKI   3,006,828
WATER DEMINERALIZING METHODS AND SYSTEMS
Filed Dec. 9, 1957   3 Sheets-Sheet 2
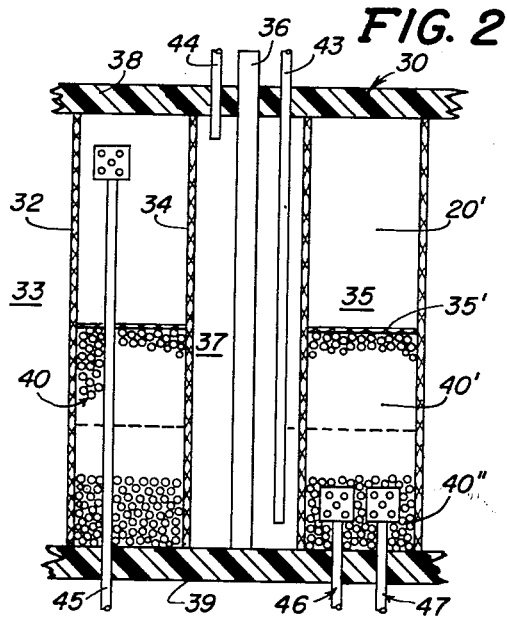
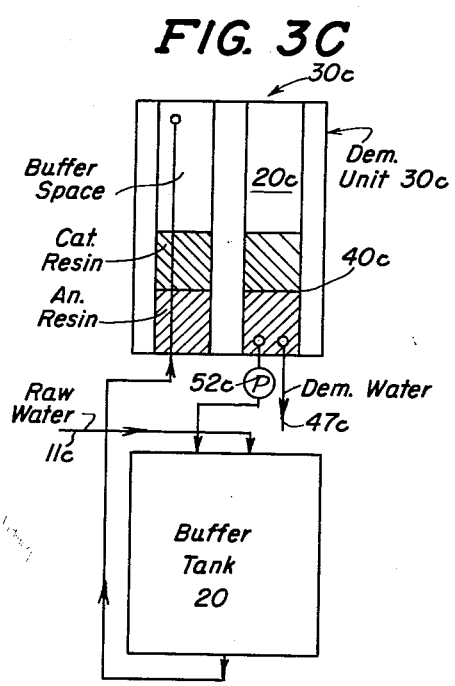
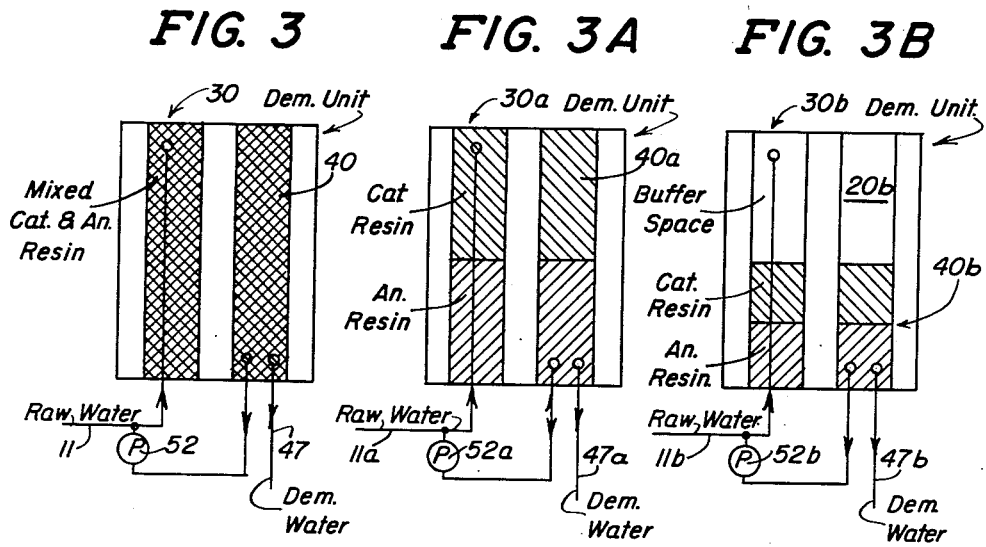
Inventor
Joseph J. Gaysowski
By
Attys.

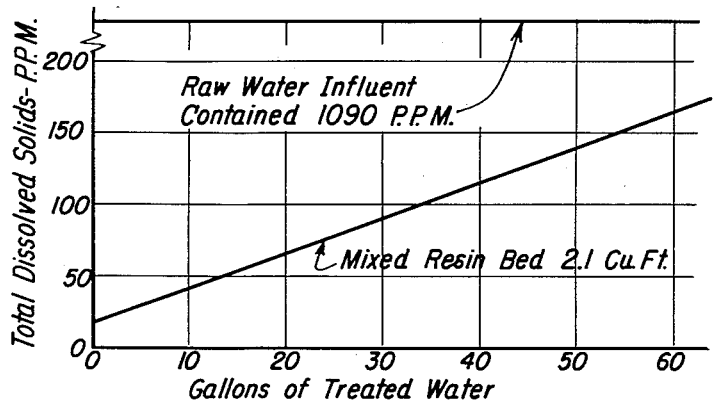

FIG. 4

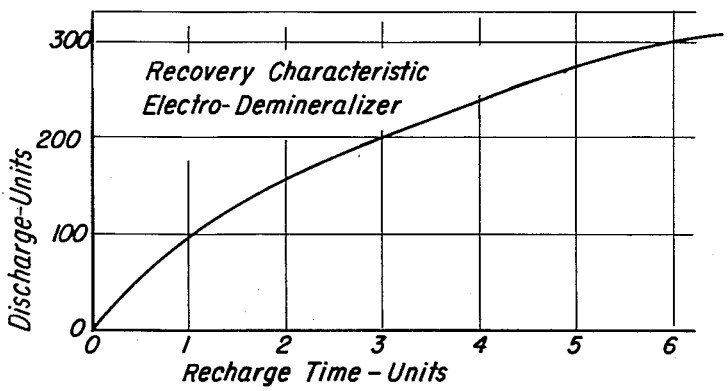

TABLE

| Electro-Demineralizer | Volume Buffer Space or Tank Gallons | Volume Resin Bed Cu.Ft. | Total Daily Capacity using Raw Water With 64 Grains/Gal. T.D.S. | | Maximum Immediate Demand Capacity Gallons | Remarks |
|---|---|---|---|---|---|---|
| | | | Gallons | Grains | | |
| Fig. #3 | None | 2.1 | 25 Approx. | 1500 Approx. | — | Mixed Resin Bed. |
| Fig. #3A | None | 2.1 | 25 to 30 | 1500 to 1800 | 4 | Separate Resins |
| Fig. #3B | 8 | 1.0 | 34 | 2000 | 8 | Separate Resins |
| Fig. #3C | 38 | 1.0 | 34 | 2000 | 30 | Separate Resins |

Inventor
Joseph J. Gaysowski
By
Smith Prangley Baird & Clayton
Attys.

United States Patent Office 3,006,828
Patented Oct. 31, 1961

3,006,828
WATER DEMINERALIZING METHODS
AND SYSTEMS
Joseph J. Gaysowski, Chicago, Ill., assignor to General
Electric Company, a corporation of New York
Filed Dec. 9, 1957, Ser. No. 701,464
14 Claims. (Cl. 204—151)

The present invention relates to water demineralizing methods and systems, and particularly to such methods and systems employing an electro-demineralizer unit involving both ion exchange and electrodialysis.

It is a general object of the invention to provide an improved method and system of the character noted, wherein a substantial draw-off of demineralized water can be made, without excessively degenerating the resin in the unit, and with satisfactory demineralization of all of the water in the draw-off.

Another object of the invention is to provide an improved method and system of the character noted, wherein a substantially greater utilization of the capacity of the ion exchange bed in the unit is made than has been heretofore realized.

A further object of the invention is to provide an improved method and system of the character noted, wherein the regeneration rate of the ion exchange bed in the unit, following a draw-off, is substantially more rapid than has been heretofore effected.

Further features of the invention pertain to the particular arrangement of the steps of the method and of the elements of the system, whereby the above-outlined and additional operating features thereof are attained.

The invention, both as to its organization and method of operation, together with further objects and advantages thereof, will best be understood by reference to the following specification taken in connection with the accompanying drawings, in which:

FIG. 2 is a fragmentary diagrammatic illustration of a modified form of a demineralizing unit incorporated in the system;

FIG. 3 is a schematic diagram of a conventional water demineralizing system employing an electro-demineralizing unit of the type noted;

FIG. 3A is a schematic diagram of another conventional water demineralizing system employing an electro-demineralizing unit of the type noted;

FIG. 3B is a schematic diagram of a water demineralizing system embodying the present invention;

FIG. 3C is a schematic diagram of a modified form of water demineralizing system embodying the present invention;

FIG. 4 is a graphic illustration of the quality of the water in a draw-off from the conventional water demineralizing system of FIG. 3A;

FIG. 5 is a graphic illustration of the recovery characteristic of an electro-demineralizer of the type noted; and FIG. 6 is a table presenting comparisons of the performance characteristics of the four water demineralizing systems respectively shown in FIGS. 3, 3A, 3B, and 3C.

Figure 1:
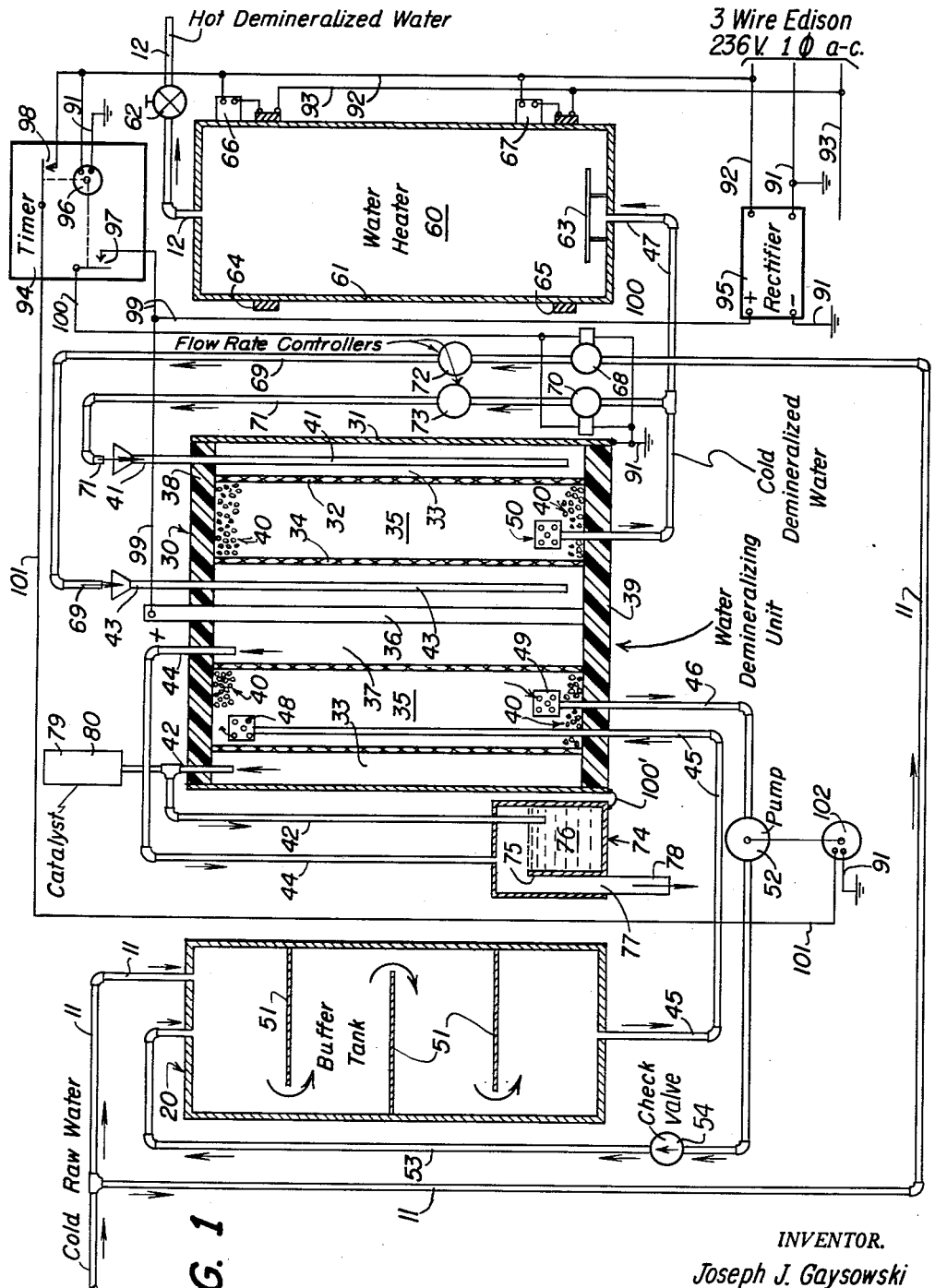
FIGURE 1 is a diagrammatic illustration of a water demineralizing system embodying the present invention, and in which the method of the present invention is carried out.

At the outset, it is noted that the present invention is predicated upon the discovery that the performance characteristics of a water demineralizing system employing an electro-demineralizing unit involving both ion exchange and electrodialysis can be drastically improved by circulating the water from a buffer space or buffer tank into the treatment chamber of the unit in which the ion exchange bed is arranged and therethrough and thence back to the buffer space or buffer tank, together with introducing the raw water into the buffer space or buffer tank, and with supplying the demineralized water from the treatment chamber of the unit. This improved method and system takes advantage of the peculiar recovery characteristic of the unit and thus leads to the realization of vastly improved operating and performance characteristics in the system. More particularly, the recovery or regeneration time interval required to return the ion exchange bed in the unit back to a state of maximum charge is greatly disproportional to the state of depletion of the charge thereof, whereby the unit is ideally suited to the demineralization of raw water that does not contain an exceedingly high concentration of dissolved mineral salts therein, whereby the unit should not be employed directly to demineralize many sources of raw water encountered in many municipal and private water supply systems. In accordance with the method and system of the present invention, the raw water supply to the system is first substantially diluted with previously demineralized water in the buffer space or buffer tank, whereby the thus mixed water that is encountered by the ion exchange bed in the unit has a substantially reduced concentration of dissolved mineral salts therein with respect to that of the raw water, whereby the unit is operated in the lower extremity of its range, without undue depletion of the state of full charge thereof to demineralize the mixed water, with the results that the efficiency of the unit is drastically improved, that the recovery time interval thereof following a draw-off is greatly minimized, that the high quality of the water in a draw-off is sustained even though the volume of the draw-off is many times greater than that heretofore realized, and that the volume of the bed of cation exchange resin and anion exchange resin can be substantially reduced without impairing the operating characteristics of the system.

Referring now to FIG. 1 of the drawings, the water demineralizing system there illustrated, and embodying the features of the present invention, is especially designed for home use and essentially comprises a cold raw water supply pipe 11, a hot demineralized or treated water supply pipe 12, a buffer tank 20, an electro-demineralizing unit 30, and a water heater 60, which is merely typical of an end use for the demineralized water. The raw water in the raw water supply pipe 11 is under gauge pressure and is connected to the city water main, not shown; while the demineralized or treated water supply pipe 12 is connected to the hot water system, or to other plumbing, not shown. The raw water in the supply pipe 11 contains substantial dissolved mineral salts supplying thereto such cation as: $Ca^{++}$, $Mg^{++}$, $Fe^{++}$, $Na^+$, $Al^{+++}$, etc., and such anions as: $HCO_3^-$, $SO_4^{--}$, $Cl^-$, $CO_3^{--}$, etc. Moreover, this raw water may be quite hard and may have a total dissolved solids content as high as 64 grains/gallon (1090 p.p.m.), this being the specification of La Grange Park, Illinois well water that has been employed in certain tests of the present system, because of the extremely high total dissolved solids content thereof, as explained more fully hereinafter. In the operation of the unit 30, the raw water is demineralized, whereby the demineralized or treated water delivered to the supply pipe 12 has a total dissolved solids content not in excess of 3 grains/gallon (51 p.p.m.).

Preferably, the unit 30 is of the fundamental construction and arrangement disclosed in the copending application of Edgar S. Stoddard, Serial No. 562,202, filed January 30, 1956, now U.S. Patent No. 2,906,684, granted on September 29, 1959; and the unit 30 essentially comprises a tubular outer shell 31, constituting a cathode, a tubular permeable diaphragm 32 arranged concentrically within the cathode 31 and cooperating therewith to define an annular catholyte chamber 33 therebetween, a tubular permeable diaphragm 34 arranged concentrically within the diaphragm 32 and cooperating therewith to define an annular treatment chamber 35 therebetween, and a suitable anode 36 arranged concentrically within the diaphragm 34 and cooperating therewith to define an annular anolyte chamber 37 therebetween. The elements 31, etc., and 36, are arranged in upstanding position; and the upper and lower ends of the chambers 33, 35 and 37 are respectively closed by upper and lower insulating headers 38 and 39. The cathode 31 may be formed of steel; the diaphragms 32 and 34 may be formed of suitable ceramic or wood materials; and anode 36 may be formed of carbon or platinized wire; and the headers 38 and 39 may be formed of a suitable synthetic organic resin. Also the treatment chamber 35, disposed intermediate the catholyte chamber 33 and the anolyte chamber 37, contains a porous ion exchange bed 40 of substantially annular form and substantially completely filling the same. More particularly, the bed 40 is of a mixed type comprising both cation exchange material and anion exchange material. Specifically, the ion exchange bed 40 accommodates the ready passage therethrough of the water undergoing treatment and essentially comprises a loosely packed mass of first discrete particles of cation exchange material (preferably a synthetic organic polymeric cation exchange resin) and of second discrete particles of anion exchange material (preferably a synthetic organic polymeric anion exchange resin), the two types of discrete particles mentioned being so proportioned that substantially equal cation exchange and anion exchange capacities are possessed by the bed 40. Also, it is noted that the bed 40 is sufficiently porous that raw water undergoing treatment suffers no substantial reduction of pressure in passing therethrough.

More particularly, this cation exchange resin is of bead-like formation and may comprise the strong-acid resin sold by Rohm and Haas under the name "Amberlite IR–120"; and this anion exchange resin is of bead-like formation and may comprise the strong-base resin sold by Rohm and Haas under the names "Amberlite IRA–400" and "Amberlite IRA–410." A cation exchange resin of the type specified essentially comprises a stable insoluble synthetic organic polymer, active acidic functional groups chemically bonded thereto and dissociable into free mobile cations to impart a negative charge to the polymer, and water in gel relationship with the polymer. Similarly, an anion exchange resin of the type specified essentially comprises a stable insoluble synthetic organic polymer, active basic functional groups chemically bonded thereto and dissociable into free mobile anions to impart a positive charge to the polymer, and water in gel relationship with the polymer. The active acidic functional groups attached to the associated organic polymer are oriented with respect to the interfaces thereof so as to be partially or completely dissociable in the internal gel water into fixed negative ions linked to the polymer and into mobile exchangeable positive ions; and similarly, the active basic functional groups attached to the associated organic polymer are oriented with respect to the interfaces thereof so as to be partially or completely dissociable in the internal gel water into fixed positive ions linked to the polymer and into mobile exchangeable negative ions.

Typical such polymers to which active acidic functional groups may be attached include: phenol-aldehyde resins, polystyrene-divinylbenzene copolymers, and the like; and such suitable active acidic functional groups include: $-SO_3H$, $-COOH$, and the like; $-SO_3H$ being usually preferred because of its high dissociation constant. Typical such polymers to which active basic functional groups may be attached include: urea-formaldehyde resins, melamineformaldehyde resins, polyalkylene-polyamine-formaldehyde resins, and the like; and such suitable active basic functional groups include: quaternary ammonium hydroxides, amino groups, the guanidyl group, the dicyanodiamidine group, and like organic nitrogen-containing basic groups; the quaternary ammonium hydroxide groups, the guanidine and dicyanodiamidine residue being usually preferred because of their high dissociation constants. Normally the water in gel relationship with the polymer should be present in an amount of at least 15% of the weight of the dry resin.

Further, the unit 30 comprises a conduit 41 projecting through the upper header 38 and communicating between the bottom of the catholyte chamber 33 and the exterior, and a conduit 42 projecting through the upper header 38 and communicating between the top of the catholyte chamber 33 and the exterior. Also, a conduit 43 projects through the upper header 38 and communicates between the bottom of the anolyte chamber 37 and the exterior, and a conduit 44 projects through the upper header 38 and communicates between the top of the anolyte chamber 37 and the exterior. Further, a conduit 45 projects through the lower header 39 and communicates between the upper portion of the treatment chamber 35 and the exterior, and two conduits 46 and 47, disposed in substantially diametrically opposed positions, project through the lower header 39 and communicate between the lower portion of the treatment chamber 35 and the exterior. The upper end of the conduit 45 is provided with a suitable screen 48 in order to prevent the entry thereinto of the resin beads; likewise, the upper ends of the conduits 46 and 47 are respectively provided with screens 49 and 50 to prevent the entry thereinto of the resin beads.

Preferably, the buffer tank 20 is formed of "Monel" metal, although stainless steel or porcelain coated steel can also be used, and is arranged in upstanding position; the upper end of the buffer tank 20 is connected to the raw water supply pipe 11 and the lower end thereof is connected to the conduit 45. Also, a number of baffles 51 are arranged interiorly of the buffer tank 20 for a purpose more fully explained hereinafter. A pump 52 is provided, the inlet thereof being connected to the conduit 46, and the outlet thereof being connected to a conduit 53, also extending to the top of the buffer tank 20, a check valve 54 being arranged in the conduit 53 for the purpose of preventing reverse flow of water therein, as explained below.

The water heater 60 comprises a storage tank 61 that may be formed of steel and provided with the usual galvanized interior lining, not shown. The lower end of the storage tank 61 is connected to the conduit 47 and the upper end thereof is connected to the hot demineralized water supply pipe 12, a valve, or other flow control device, 62 being arranged in the supply pipe 12. Also, a baffle 63 is arranged in the lower portion of the storage tank 61 in covering relation with respect to the associated end of the conduit 47 for the purpose of minimizing mixing of the cold demineralized water incoming to the storage tank 61 and the hot body of demineralized water stored therein. The water heater 60 may be of the electric type; whereby it is provided with upper and lower heating elements 64 and 65 respectively arranged in good heat exchange relation with the respective upper and lower end portions of the storage tank 61, as well as respectively associated upper and lower thermostatic switches 66 and 67.

Also, the cold raw water supply pipe 11 is connected by a solenoid operated valve 68 to a conduit 69 that extends into cooperating relation with the upper end of the conduit 43, the adjacent end of the conduit 69 being disposed above and in spaced relation with respect to the upper end of the conduit 43 so as to provide an air gap therebetween. Similarly, the conduit 47 is connected by a solenoid operated valve 70 to a conduit 71 that extends into cooperating relation with the upper end of the conduit 41, the adjacent end of the conduit 71 being disposed above and in spaced relation with respect to the upper end of the conduit 41 so as to provide an air gap therebetween. Flow controllers 72 and 73 are respectively arranged in the conduits 69 and 71 for the purpose of controlling and limiting the streams of anolyte and catholyte respectively delivered to the conduits 43 and 41.

Also, the unit 30 comprises a mixing tank 74 that may be formed of porcelainized steel and that includes an internal partition 75 dividing the interior thereof into a mixing compartment 76 and a drain compartment 77, the drain compartment 77 being connected by a drain conduit 78 to the drain plumbing, not shown, in the home. The conduit 44 communicating with the upper end of the anolyte chamber 37 is substantially U-shaped, the lower end thereof terminating in the mixing compartment 76; and likewise, the conduit 42 communicating with the upper end of the catholyte chamber 33 is substantially U-shaped, the lower end thereof terminating above and in spaced-apart relation with respect to the mixing compartment 76. At the upper portion of the U in the conduit 42 there is arranged a container 79 in which there is provided a charge of catalytic material 80, that is employed for the purpose of oxidizing any hydrogen gas that is contained in the catholyte discharge from the catholyte chamber 33. The catalyst 80 may essentially comprise platinum beads that are commonly employed for the purpose mentioned, and air is admitted into the container 79 via an associated filter plug, not shown, to supply the required oxygen.

Further, the system comprises a source of electric power supply that may be of the 3-wire Edison type of 236 v., A.C., single phase, including a grounded neutral line 91 and two outside ungrounded lines 92 and 93, as well as a timer 94, and a rectifier 95. The timer 94 includes an electric timer motor 96 that is of the synchronous type, and preferably is a "Telechron" timer motor; which motor 96 selectively controls a pair of switches 97 and 98. The upper heating element 64 is connected in series relation with the thermostatic switch 66 across the outside lines 92 and 93; and likewise, the lower heating element 65 is connected in series relation with the thermostatic switch 67 across the outside lines 92 and 93. The terminals of the timer motor 96 are connected across the neutral line 91 and the outside line 92; and similarly, the input terminals of the rectifier 95 are connected across the neutral line 91 and the outside line 92; while the output terminals of the rectifier 95 are respectively connected to a conductor 99 and to the neutral line 91, the negative output terminal being connected to the neutral line 91 and the positive output terminal being connected to the conductor 99. The outer shell, or cathode 31, is also directly connected to the neutral line 91 and by a strap 100 to the mixing tank 74; while the anode 36 is directly connected to the conductor 99.

The solenoids of the valve 68 and 70 are connected in parallel relation between the neutral line 91 and a conductor 100. The switch 97 respectively terminates the conductors 99 and 100; while the switch 98 respectively terminates the outside line 92 and the conductor 101. Also, an electric drive motor 102 is directly connected to the pump 52; and the terminals of the drive motor 102 are bridged across the conductor 101 and the neutral line 91.

Considering now the general mode of operation of the water demineralizing system, and assuming that the buffer tank 20, the treatment chamber 35 of the unit 30 and the storage tank 61 of the water heater 60 are full of water, the thermostats 66 and 67 are selectively controlled by the temperatures of the respectively associated portions of the storage tank 61 selectively to connect and to disconnect the respectively associated heating elements 64 and 65 across the outside lines 92 and 93 for the purpose of maintaining the body of water stored in the storage tank 61 at the proper and desired relatively high temperature in the usual manner. Accordingly, the body of demineralized water contained in the storage tank 61 is maintained in a hot condition and supplied to the hot demineralized water supply pipe 12, and is available for use upon opening of the valve 62 arranged in the supply pipe 12. In the operation of the timer 94 the switch 97 may be periodically closed and opened repeatedly in a 24-hour day; whereby the solenoids of the valves 68 and 70 are correspondingly selectively energized. The valve 68 is normally biased into its closed position, and when the solenoid thereof is energized, it is operated into its open position so that the raw water in the cold raw water supply pipe 11 is admitted into the conduit 69 and passes through the flow rate controller 72 and from the end of the conduit 69 through the associated air gap and thence into the upper end of the conduit 43; whereby the raw water is introduced into the anolyte chamber 37 and employed as the anolyte in the unit 30. Other of the anolyte in the anolyte chamber 37 is displaced therefrom into the conduit 44 and is thus introduced into the mixing compartment 76 of the mixing tank 74. Similarly, the valve 70 is normally biased into its closed position, and when the solenoid thereof is energized, it is operated into its open position so that demineralized water in the cold demineralized water conduit 47 is admitted into the conduit 71 and passes through the flow rate controller 73 and from the end of the conduit 71 through the associated air gap and thence into the upper end of the conduit 41; whereby the demineralized water is introduced into the catholyte chamber 33 and employed as the catholyte in the unit 30. Other of the catholyte in the catholyte chamber 33 is displaced therefrom into the conduit 42 and then passes from the end of the conduit 42 through the air gap into the mixing compartment 76 of the mixing tank 74. Accordingly, the anolyte from the conduit 44 and the catholyte from the conduit 42 are mixed in the mixing compartment 76 of the mixing tank 74 and thence flow into the drain compartment 77 from which the mixture is discharged via the drain conduit 78 into the associated drain plumbing, not shown.

As previously explained, the anode 36 and the cathode 31 are respectively connected to the positive and negative output terminals of the rectifier 95; whereby a current flows from the anode 36 to the cathode 31 through the anolyte in the anolyte chamber 37, the diaphragm 34, the water undergoing treatment and the ion exchange bed 40 in the treatment chamber 35, the diaphragm 32 and the catholyte in the catholyte chamber 33 to the cathode 31; which current effects demineralization of the water in the treatment chamber 35, together with the ion exchange action of the bed 40, as explained more fully hereinafter. Accordingly, the water undergoing treatment in the treatment chamber 35 is demineralized, the cations of the dissolved mineral salts migrating into the catholyte contained in the catholyte chamber 33 through the permeable diaphragm 32, and the anions of the dissolved mineral salts migrating into the anolyte contained in the anolyte chamber 37 through the permeable diaphragm 34; whereby the cations are transported with the catholyte into the mixing tank 74 and the anions are transported with the anolyte into the mixing tank 74.

Now, when a draw-off of the hot demineralized water is required, the valve 62 is opened and subsequently reclosed; whereby the hot demineralized water is supplied from the upper portion of the storage tank 61 into the hot demineralized water supply pipe 12; simultaneously, cold raw water is supplied from the lower portion of the buffer tank 20 via the conduit 45 into the upper portion of the treatment chamber 35 in the unit 30, and flows downwardly therethrough and through the porous ion exchange bed 40 and from the lower portion of the treatment chamber 35 via the conduit 47 into the lower portion of the storage tank 61; simultaneously cold raw water from the cold raw water pipe 11 enters the upper portion of the buffer tank 20 and flows downwardly in a sinuous passage therethrough, as established by the baffles 51 therein, to the lower portion thereof. Of course, the pressure throughout the system between the cold raw water supply pipe 11 and the hot demineralized water supply pipe 12 is substantially uniform and substantially at the gauge pressure of the city water main, not shown. As previously noted, the cold raw water is first mixed with the demineralized water in the buffer tank 20, and then the thus diluted raw water, or mixture of raw water and demineralized water is, in turn, demineralized in passing through the treatment chamber 35 of the unit 30 and the cold demineralized water is heated in passing through the storage tank 61 of the water heater 60.

Also, in the operation of the timer 94, the switch 98 may be periodically closed and opened repeatedly in a 24-hour day; whereby the pump drive motor 102 is correspondingly and selectively operated. Upon operation of the drive motor 102, the pump 52 is operated to effect circulation of the water from the lower portion of the treatment chamber 35 in the unit 30 via the conduit 46 and through the check valve 54 and via the conduit 53 into the upper portion of the buffer tank 20, and from the lower portion of the buffer tank 20 via the conduit 45 into the upper portion of the treatment chamber 35 of the unit 30. This circulated water in the treatment chamber 35 passes downwardly through the porous ion exchange bed 40 and is subjected to ion exchange; while the circulated water in the buffer tank 20 passes downwardly in the sinuous path established by the baffles 51 and is subjected to mixing with the body of water contained in the buffer tank 20.

In a construction example of the water demineralizing unit shown in FIG. 1, the buffer tank 20 had a volume of 50 gallons, the storage tank 61 of the water heater 60 had a volume of 50 gallons; and the electro-demineralizing unit 30 was constructed involving the following dimensions: The internal diameter of the diaphragm 32 was about 12"; the external diameter of the diaphragm 34 was 4"; the internal diameter of the cathode 31 was 16"; the height of the treatment chamber 35 between the headers 38 and 39 was about 36"; and the thickness of the treatment chamber 35 between the diaphragms 32 and 34 was about 4". Accordingly, the volume of the treatment chamber 35 was about 2.1 cubic feet. The water pressure in the treatment chamber 35 was not in excess of 45 p.s.i.; and the power consumption at 60 to 80 volts D.-C. was in the general range 100 to 600 watts. In certain of the tests, more fully described hereinafter, the ion exchange bed 40 was arranged substantially completely to fill the treatment chamber 35; whereby, in this case it had a volume of about 2.1 cubic feet and was composed of substantially equal volumes of the cation exchange resin "Amberlite IR–120" and of the anion exchange resin "Amberlite IRA–410."

In the system, the capacity of the pump 52 and the total time intervals of operation thereof were variably set so that the total rate of circulation of the water between the buffer tank 20 and the treatment chamber 35 of the unit 30 was in the general range 4 to 25 gallons/hour; whereby, the total water was recirculated within 2 to 12 hours. The circulation may be continuous at a suitable low rate or intermittent at a suitable high rate, as long as the overall rate is within the general range of 2 to 12 complete recirculations of the water in the system during each 24-hour day.

Before considering in greater detail the operation of the system of FIG. 1, it is noted that a modification therein was also tested, a fragmentary portion of this modified form of the system being illustrated in FIG. 2. More particularly, in FIG. 2 the central portion of the unit 30 is illustrated and in this case the total volume of the ion exchange bed 40 was reduced to 1 cubic foot, and the bed was arranged in two stratified layers 40' and 40", respectively comprising the cation exchange resin and the anion exchange resin. Also, in this arrangement, the space in the treatment chamber disposed above the resin bed 40 comprised a buffer space 20' that was filled with the water undergoing treatment, the top of the resin bed 40 being separated from the bottom of the buffer space 20' by an interposed foraminous plastic insulating screen 35'. Accordingly, in this embodiment of the unit 30, the bed 40 had a total volume of 1 cubic foot and the buffer space 20' had a volume of about 1.1 cubic feet (approximately 8 gallons). The modified form of the water demineralizing system of FIG. 2 was otherwise identical to that of FIG. 1 previously described.

In certain of the previously mentioned tests, an arrangement of the unit 30 was employed that is disclosed in the previously mentioned Stoddard patent, as indicated in FIG. 3; whereby, in this Stoddard arrangement the ion exchange bed 40 had a volume of 2.1 cubic feet and was of the mixed resin type as previously described in conjunction with FIG. 1; the raw water from the supply pipe 11 was introduced directly into the upper portion of the resin bed 40; the water was circulated from the upper portion of the resin bed 40 downwardly therethrough to the lower portion thereof and thence to the outside and back again by the associated pump 52; and the demineralized water was withdrawn from the lower portion of the treatment chamber via the conduit 47.

In another test, a modified Stoddard arrangement of the unit 30a, as shown in FIG. 3A, was employed; wherein the ion exchange bed 40a was stratified, including an upper section of cation exchange resin of 1.1 cubic feet and a lower section of anion exchange resin of 1.1 cubic feet; the raw water from the supply pipe 11a was introduced directly into the upper portion of the resin bed 40a; the water was circulated from the upper portion of the resin bed 40a downwardly therethrough to the lower portion thereof and thence to the outside and back again by the associated pump 52a; and the demineralized water was withdrawn from the lower portion of the treatment chamber via the conduit 47.

In other of the previously mentioned tests, the inventive arrangement of the unit 30b was employed, as indicated in FIG. 3B; whereby, in this inventive arrangement the ion exchange bed 40b had a volume of only 1 cubic foot and was of the stratified resin type as previously described in conjunction with FIG. 2; the buffer space 20b had a volume of about 8 gallons; the raw water from the supply pipe 11b was introduced directly into the upper portion of the buffer space 20b; the water was circulated downwardly through the buffer space 20b and thence downwardly through the resin bed 40b, and thence to the outside and back again by the associated pump 52b; and the demineralized water was withdrawn from the lower portion of the treatment chamber via the conduit 47b.

In further of the previously mentioned tests, the inventive arrangement of the unit 30c was employed, as indicated in FIG. 3C; whereby, in this inventive arrangement the ion exchange bed 40c had a volume of only 1 cubic foot and was of the stratified resin type as previously described in conjunction with FIG. 2; the buffer space 20c had a volume of about 8 gallons; the raw water from the supply pipe 11c was introduced into the upper portion of the regular buffer tank 20 (of only 30 gallon volume) and circulated therethrough and introduced into the upper portion of the buffer space 20c; the water was then circulated downwardly through the buffer space 20c and thence downwardly through the resin bed 40c and thence to the outside by the associated pump 52c; the water was then introduced into the upper portion of the regular buffer tank (in these tests the buffer tank 20 had a volume of only 30 gallons); and the demineralized water was withdrawn from the lower portion of the treatment chamber via the conduit 47c.

In tests involving the Stoddard arrangement of the water dimineralizing system shown in FIG. 3, La Grange Park, Illinois, well water having a total dissolved solids content of 64 grains/gallon (1090 p.p.m.) was employed; and after maximum charging of the resin bed 40 (2.1 cubic foot volume), a continuous draw-off was made at the conduit 47 with the result that the raw water from the raw water supply pipe 11 passed downwardly through the mixed resin bed 40. Samples of this continuous draw-off were progressively taken and tested for the total dissolved solids content thereof; with the results shown by the graph of FIG. 4. The initial portion of the draw-off contained a total dissolved solids content that was about 20 p.p.m.; however, the total dissolved solids content of the water in the draw-off was progressively increased, with the result that after about 15 gallons of the draw-off, the total dissolved solids content exceeded 51 p.p.m. (3 grains/gallon). As illustrated, after about 35 gallons of the draw-off, the total dissolved solids content exceeded 100 p.p.m.; and after about 55 gallons of the draw-off, the total dissolved solids content exceeded 150 p.p.m. Accordingly, it is apparent that in the Stoddard water demineralizing system of FIG. 3, the quality of the water in a continuous draw-off is progressively reduced and exceeds the desired total dissolved solids content of 3 grains/gallon (51 p.p.m.) in the event the continuous draw-off has a volume in excess of 15 gallons.

Of course, in the draw-off the raw water that is introduced in the upper portion of the resin bed 40 is substantially demineralized by the ion exchange therein, since the La Grange Park water used had a total dissolved solids content of 1090 p.p.m. (64 grains/gallon). In this demineralization the cations are exchanged for hydrogen ions and the anions are exchanged for hydroxyl ions in the resin bed 40, whereby both the cation exchange resin and the anion exchange resin therein are progressively depleted during the draw-off. Following the draw-off, and as time proceeds, these cations and anions sorbed by the resin bed 40 are re-exchanged for hydrogen ions and hydroxyl ions from the water in the treatment chamber 35 by virtue of the electric currents, wherein the released cations migrate through the diaphragm 32 into the catholyte and the released anions migrate through the diaphragm 34 into the anolyte. In this electrodialysis the regeneration of the ion exchange bed 40 takes place and it is postulated that the resins constitute solid poly-electrolytes for the transportation of the ions involved from the treatment chamber 35; and specifically, it is visualized that the cations are involved in a great multiplicity of exchanges with a considerable number of the individual cation exchange particles in their movements toward the cathode 31, and that the anions are involved in a great multiplicity of exchanges with a considerable number of the individual anion exchange particles in their movements toward the anode 36; the mechanism involved being visualized as like the mode involved in playing the child's game of "musical chairs." In this mechanism, it is suggested that the electric potential required to effect the successive ion exchanges of a great number of the ions in the resin bed 40, and the consequent transportation of a given number of the ions out of the treatment chamber 35, is very small compared to the electric potential required to effect the direct migration of the same given number of ions from the treatment chamber 35, in the absence of the resin bed 40.

In any case, and without reference to the exact mechanism involved, the energy requirements of the unit 30, incorporating the resin bed 40, to bring about a predetermined electrodialysis of a given volume of raw water of a given total dissolved solids content is greatly reduced with respect to electrolytic apparatus involving no ion exchange resin; and this fact is immediately apparent by the tremendous reduction in the amount of voltage required satisfactorily to operate the unit 30. Moreover, the temperature of the treated water in the treatment chamber, after being subjected to the electrodialysis, is not substantially elevated above the ambient temperature.

Now, the time interval required to recover the original or maximum regeneration of the mixed resin bed 40 in the unit 30 is altogether disproportional to the state of discharge of the resin bed 40, as generally illustrated by the curve of FIG. 5. More particularly, in the event there is only a discharge of the resin bed 40 of 100 units (this unit corresponding to the extraction of a given number of grains of dissolved solids from the water in the treatment chamber), the time interval required to regenerate the resin bed 40 to its original state of regeneration (in hours under standard conditions) is only about 1 unit. On the other hand, in the event the discharge of the resin bed 40 respectively corresponds to 200 and 300 units, the time interval mentioned may respectively correspond to 3 and 6 units. The curve of FIG. 5 is plotted to no particular scale, but the characteristic mentioned is well defined, whereby it is apparent that the resin bed 40 is not really ideally suited to the demineralization of a substantial continuous draw-off of water, when the raw water involved has a high total dissolved solids content.

Now in comparable tests, the characteristics of the modified Stoddard arrangement of FIG. 3A, and of the inventive arrangements of FIGS. 3B and 3C were determined; and the fundamental results of these tests, together with the previously described tests of the Stoddard system of FIG. 3, are compiled in the table of FIG. 6. More particularly as shown in this table, the Stoddard systems of FIGS. 3 and 3A comprised no buffer space or buffer tank, the inventive system of FIG. 3B comprised only the buffer space 20b of a volume of 8 gallons, and the inventive system of FIG. 3C comprised both the buffer space 20c of a volume of 8 gallons and the regular buffer tank 20 of a volume of 30 gallons, or a total effective buffer volume of 38 gallons. Also as shown in this table, the stratified resin bed 40a of the modified Stoddard system of FIG. 3A had a volume of 2.1 cubic feet, while the stratified resin beds 40b and 40c of the respective inventive systems of FIGS. 3B and 3C each had a volume of only 1 cubic foot. Also as shown in this table, the maximum immediate demand capacities of the three systems of FIGS. 3A, 3B and 3C were respectively 4 gallons, 8 gallons and 30 gallons, the maximum immediate demand capacity comprising the maximum number of gallons in a continuous draw-off that could be effected without the total dissolved solids content of the water in the demineralized water conduit 47a, 47b, or 47c, exceeding 3 grains/gallon, when the previously described La Grange Park raw water was employed in the raw water supply pipe 11a, 11b or 11c. Further, the total daily capacities of these three systems to effect the reduction of the total dissolved solids content of the La Grange Park water to the value of 3 grains/gallon were respectively 25 to 30 gallons, 34 gallons and 34 gallons; while the total daily capacities of these three systems to effect the removal of dissolved solids in total grains were 1500 to 1800, 2000 and 2000.

The inventive system of FIG. 3B has a maximum demand capacity that is twice that of the Stoddard system of FIG. 3A, notwithstanding the circumstance that the volume of the resin bed 40b is only about 48% of that of the resin bed 40a; whereby the efficiency of the inventive system of FIG. 3B in this respect is at least 420% of that of the Stoddard system of FIG. 3A. Also, the efficiency of the inventive system of FIG. 3B with respect to the total daily capacity is about 130% of that of the modified Stoddard system of FIG. 3A.

Of course, the inventive system of FIG. 3C achieves an increase of almost 800% in the maximum demand capacity with respect to that of the modified Stoddard system of FIG. 3A, due to the provision of the buffer tank 20 having a volume of only 30 gallons in the reported tests. In this regard, it will be immediately apparent that the maximum demand capacity of the inventive system of FIG. 3C can be proportionately increased by increasing the volume of the buffer tank 20 employed in conjunction with the unit 30c; whereby the recommended volume of the buffer tank 20 is about 50 gallons, as previously explained in conjunction with FIG. 1.

In view of the foregoing, it is apparent that the improved operating characteristics of the inventive systems of FIGS. 3B and 3C, with respect to those of the Stoddard systems of FIGS. 3 and 3A, are due entirely to the provision of the effective buffer space or buffer tank preceding the ion exchange bed in the treatment chamber; and of course, the fundamental reason for the improved performances in this regard is related fundamentally to the recovery or regeneration characteristic of the resin bed in the electro-demineralizing unit. Specifically, the dilution of the raw water with the previously demineralized water prior to the contact thereof with the resin bed prevents substantial degeneration of the resin bed, so that the required modest regeneration thereof may be effected in the lower extremity of maximum effectiveness of the regeneration process of the resin bed, as shown in FIG. 5.

In view of the foregoing, it is apparent that there have been disclosed both an improved method of demineralizing raw water and an improved system for effecting this result, and utilizing an electro-demineralizing unit involving a resin bed containing cation exchange material and anion exchange material, whereby the raw water is subjected to both ion exchange and electrodialysis, and wherein the resin bed is regenerated by electrolysis, or electrodialysis, following each draw-off in an efficient and simple manner. Also, it is apparent that the method and the apparatus are substantially ideally suited for home use, and other installations which require water containing almost no minerals or dissolved ions.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. The method of demineralizing raw water, comprising providing a unit including structure defining first and second and third chambers having a first diaphragm as a common wall between said first and second chambers and a second diaphragm as a common wall between said second and third chambers and having an anode arranged in said first chamber and a cathode arranged in said third chamber and having a porous ion exchange bed arranged in said second chamber and characterized by both cation exchange and anion exchange, providing a buffer space having a volume at least as large as that of said second chamber, introducing a charge of previously demineralized water into said buffer space from said second chamber, introducing raw water into said buffer space and into admixture with the previously demineralized water therein, whereby the resulting mixed water in said buffer space has a concentration of dissolved mineral salts therein that is substantially less than that of the raw water, circulating the resulting water from said buffer space into said second chamber and through said porous ion exchange bed and into contact with said first and second diaphragms and from said second chamber back into said buffer space, whereby said ion exchange bed is subjected to degeneration by the exchange of sorbed hydroxyl ions and hydrogen ions for the anions and cations of the mineral salts dissolved in the water circulated therethrough and with the result that the circulated water is demineralized, drawing off demineralized water from said second chamber, conducting a first stream of water as an anolyte through said first chamber into contact with said anode and said first diaphragm, conducting a second stream of water as a catholyte through said third chamber into contact with said cathode and said second diaphragm, and conducting a direct current from said anode to said cathode through the water in said first and second and third chambers and through said first and second diaphragms and through said ion exchange bed, whereby said ion exchange bed is subjected to regeneration by the exchange of the sorbed anions and cations of the previously mentioned salts for hydroxyl ions and hydrogen ions and with the migration of the released anions and cations mentioned respectively through said first diaphragm into said anolyte and through said second diaphragm into said catholyte.

2. The method set forth in claim 1, wherein said buffer space and said second chamber have a combined volume of V gallons, and the rate of circulation of the water between said buffer space and said second chamber per 24-hour day is within the general range of about 2V to about 12V gallons.

3. The method set forth in claim 1, wherein said ion exchange bed essentially comprises synthetic organic polymeric anion exchange resin and synthetic organic polymeric cation exchange resin.

4. The method set forth in claim 1, wherein said ion exchange bed has a capacity to remove dissolved salts from the water circulated therethrough of about 1500 to 3000 grains of total dissolved solids per 24-hour day.

5. The method set forth in claim 1, wherein said second chamber and said buffer space have a combined volume sufficiently large that a draw-off of about 30 gallons of demineralized water from said second chamber does not cause the total dissolved solids content thereof to exceed 3 grains per gallon, even when the raw water has a total dissolved solids content as high as about 64 grains per gallon.

6. The method set forth in claim 1, wherein said circulation of the resulting water from said buffer space into said second chamber and therefrom back into said buffer space is continuous during each 24-hour day.

7. The method set forth in claim 1, wherein said circulation of the resulting water from said buffer space into said second chamber and therefrom back into said buffer space is intermittent during each 24-hour day.

8. The method of demineralizing a volume of V1 of raw water having a given concentration of dissolved mineral salts therein, comprising providing a unit including structure defining first and second and third chambers having a first diaphragm as a common wall between said first and second chambers and a second diaphragm as a common wall between said second and third chambers and having an anode arranged in said first chamber and a cathode arranged in said third chamber and having a porous ion exchange bed arranged in said second chamber and characterized by both cation exchange and anion exchange, providing a buffer tank having a volume V2 that is greater than V1 and connected to said second chamber, drawing off from said second chamber a volume V1 of previously demineralized water supplied substantially from said buffer tank and simultaneously introducing the volume V1 of raw water into said buffer tank, whereby the resulting mixed water in said buffer tank has a concentration of dissolved mineral salts therein that is substantially less than that of the raw water, circulating the mixed water from said buffer tank into said second chamber and through said porous ion exchange bed and into contact with said first and second diaphragms and from said second chamber back into said buffer tank, whereby said ion exchange bed is subjected to degeneration by the exchange of sorbed hydroxyl ions and hydrogen ions for the anions and cations of the mineral salts dissolved in the water circulated therethrough and with the result that the circulated water is demineralized, conducting a first stream of water as an anolyte through said first chamber into contact with said anode and said first diaphragm, conducting a second stream of water as a catholyte through said third chamber into contact with said cathode and said second diaphragm, and conducting a direct current from said anode to said cathode through the water in said first and second and third chambers and through said first and second diaphragms and through said ion exchange bed, whereby said ion exchange bed is subjected to regeneration by the exchange of the sorbed anions and cations of the previously mentioned mineral salts for hydroxyl ions and hydrogen ions and with the migration of the released anions and cations mentioned respectively through said first diaphragm into said anolyte and through said second diaphragm into said catholyte.

9. In a water demineralizing system: a demineralizing unit including structure defining first and second and third chambers and provided with a first diaphragm as a common wall between said first and second chambers and a second diaphragm as a common wall between said second and third chambers, an anode in said first chamber, a cathode in said second chamber, and a porous ion exchange bed arranged in said second chamber and characterized by both cation exchange and anion exchange; an inlet pipe adapted to contain raw water under pressure; a buffer tank independent of said demineralizing unit and directly connected to said inlet pipe and adapted to be supplied directly therefrom with raw water under pressure, said buffer tank having a volume at least as large as that of said second chamber and such that the raw water supplied directly thereto is admixed with previously demineralized water therein so that the resulting mixed water in said buffer tank has a concentration of dissolved mineral salts therein that is substantially less than that of the raw water; means for circulating water from said buffer tank into said second chamber and through said porous ion exchange bed and into contact with said first and second diaphragms and from said second chamber back into said buffer tank, whereby said ion exchange bed is subjected to degeneration by the exchange of sorbed hydroxyl ions and hydrogen ions for the anions and cations of the mineral salts dissolved in the water circulated therethrough and with the result that the circulated water is demineralized in said second chamber and stored fundamentally in said buffer tank so as to be available for admixture with the raw water directly supplied from said inlet pipe into said buffer tank; an outlet pipe connected to said second chamber and adapted to be supplied therefrom with demineralized water under pressure; first conduit means for conducting a stream of water as an anolyte through said first chamber into contact with said anode and said first diaphragm; second conduit means for conducting another stream of water as a catholyte through said third chamber into contact with said cathode and said second diaphragm; and means for conducting a direct current from said anode to said cathode through the water in said first and second and third chambers and through said first and second diaphragms and through said ion exchange bed, whereby said ion exchange bed is subjected to regeneration by the exchange of the sorbed anions and cations of the previously mentioned mineral salts for hydroxyl ions and hydrogen ions and with the migration of the released anions and cations mentioned respectively through said first diaphragm into said anolyte and through said second diaphragm into said catholyte.

10. The water demineralizing system set forth in claim 9, wherein said buffer tank and said second chamber have a combined volume of V gallons, and the rate of circulation of the resulting water from said buffer tank into said second chamber and therefrom back into said buffer tank per 24-hour day is within the general range of about 2V to about 12V gallons.

11. The water demineralizing system set forth in claim 9, wherein said ion exchange bed essentially comprises synthetic organic polymeric anion exchange resin and synthetic organic polymeric cation exchange resin.

12. In a water demineralizing system: a demineralizing unit including structure defining first and second and third chambers and provided with a first diaphragm as a common wall between said first and second chambers and a second diaphragm as a common wall between said second and third chambers, an anode in said first chamber, a cathode in said third chamber, and a porous ion exchange bed arranged in said second chamber and characterized by both cation exchange and anion exchange; an inlet pipe adapted to contain raw water under pressure; a buffer tank independent of said demineralizing unit and directly connected to said inlet pipe and adapted to be supplied directly therefrom with raw water under pressure, said buffer tank having a volume at least as large as that of said second chamber and such that the raw water supplied directly thereto is admixed with previously demineralized water therein so that the resulting mixed water in said buffer tank has a concentration of dissolved mineral salts therein that is substantially less than that of the raw water; a first conduit extending from the outlet of said buffer tank to the upper portion of said second chamber; a second conduit extending from the lower portion of said second chamber to the inlet of said buffer tank; pump means for circulating water from said buffer tank via said first conduit into said second chamer and through said porous ion exchange bed and into contact with said first and second diaphragms and from said second chamber via said second conduit back into said buffer tank, whereby said ion exchange bed is subjected to degeneration by the exchange of sorbed hydroxyl ions and hydrogen ions for the anions and cations of the mineral salts dissolved in the water circulated therethrough and with the result that the circulated water is demineralized in said second chamber and stored fundamentally in said buffer tank so as to be available for admixture with the raw water directly supplied from said inlet pipe into said buffer tank; an outlet pipe connected to said second chamber and adapted to be supplied therefrom with demineralized water under pressure; first conduit means for conducting a stream of water as an anolyte through said first chamber into contact with said anode and said first diaphragm; second conduit means for conducting another stream of water as a catholyte through said third chamber into contact with said cathode and said second diaphragm; and means for conducting a direct current from said anode to said cathode through the water in said first and second and third chambers and through said first and second diaphragms and through said ion exchange bed, whereby said ion exchange bed is subjected to regeneration by the exchange of the sorbed anions and cations of the previously mentioned mineral salts for hydroxyl ions and hydrogen ions and with the migration of the released anions and cations mentioned respectively through said first diaphragm into said anolyte and through said second diaphragm into said catholyte.

13. In a water demineralizing system: a demineralizing unit including structure defining first and second and third chambers and provided with a first diaphragm as a common wall between said first and second chambers and a second diaphragm as a common wall between said second and third chambers, an anode in said first chamber, a cathode in said third chamber, and a porous ion exchange bed arranged in said second chamber characterized by both cation exchange and anion exchange; an inlet pipe adapted to contain raw water under pressure; a buffer tank independent of said demineralizing unit and directly connected to said inlet pipe and adapted to be supplied directly therefrom with raw water under pressure, said buffer tank having a volume at least as large as that of said second chamber and such that the raw water supplied directly thereto is admixed with previously demineralized water therein so that the resulting mixed water in said buffer tank has a concentration of dissolved mineral salts therein that is substantially less than that of the raw water; a pump operative to circulate water from said buffer tank into said second chamber and through said porous ion exchange bed and into contact with said first and second diaphragms and from said second chamber back into said buffer tank, whereby said ion exchange bed is subjected to degeneration by the exchange of sorbed hydroxyl ions and hydrogen ions for the anions and cations of the mineral salts dissolved in the water circulated therethrough and with the result that the circulated water is demineralized in said second chamber and stored fundamentally in said buffer tank so as to be available for admixture with the raw water directly supplied from said inlet pipe into said buffer tank; an electric motor for operating said pump; an outlet pipe connected to said second chamber and adapted to be supplied therefrom with demineralized water under pressure; first conduit means for conducting a stream of water as an anolyte through said first chamber into contact with said anode and said first diaphragm; second conduit means for conducting another stream of water as a catholyte through said third chamber into contact with said cathode and said second diaphragm; electro-responsive valve means for controlling the flow of water through said first and second conduit means; a source of electric power; timer means operated from said power source for selectively operating said motor and said electroresponsive valve means from said power source; and additional means operated from said power source for conducting a direct current from said anode to said cathode through the water in said first and second and third chambers and through said first and second diaphragms and through said ion exchange bed, whereby said ion exchange bed is subjected to regeneration by the exchange of the sorbed anions and cations of the previously mentioned mineral salts for hydroxyl ions and hydrogen ions and with the migration of the released anions and cations mentioned respectively through said first diaphragm into said anolyte and through said second diaphragm into said catholyte.

14. The water demineralizing system set forth in claim 13, wherein the interior of said buffer tank is provided with baffle structure insuring thorough mixing of the water contained therein with both the water introduced thereinto from said inlet pipe and the water circulated between said buffer tank and said second chamber.

References Cited in the file of this patent

UNITED STATES PATENTS 2,777,811    McRae et al. _____ Jan. 15, 1957
2,812,300    Pearson _____ Nov. 5, 1957

OTHER REFERENCES

Kunin et al.: "Ion Exchange Resins," pp. 78–87, 1950.